(12) United States Patent
Bentov

(10) Patent No.: US 11,079,821 B2
(45) Date of Patent: *Aug. 3, 2021

(54) STYLUS COMMUNICATION WITH NEAR-FIELD COUPLING

(71) Applicant: Wacom Co., Ltd., Saitama (JP)

(72) Inventor: Izhar Bentov, Sunnyvale, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,086

(22) Filed: Dec. 16, 2019

(65) Prior Publication Data

US 2020/0117255 A1 Apr. 16, 2020

Related U.S. Application Data

(63) Continuation of application No. 15/909,755, filed on Mar. 1, 2018, now Pat. No. 10,509,451, which is a continuation of application No. 13/630,990, filed on Sep. 28, 2012, now Pat. No. 9,921,626.

(51) Int. Cl.
| | |
|---|---|
| *G06F 1/26* | (2006.01) |
| *G06F 3/0354* | (2013.01) |
| *G06F 3/041* | (2006.01) |
| *G06F 3/044* | (2006.01) |

(52) U.S. Cl.
CPC ............ *G06F 1/26* (2013.01); *G06F 3/03545* (2013.01); *G06F 3/0441* (2019.05); *G06F 3/0442* (2019.05); *G06F 3/0443* (2019.05); *G06F 3/0445* (2019.05); *G06F 3/0446* (2019.05); *G06F 3/04162* (2019.05); *G06F 2203/04101* (2013.01)

(58) Field of Classification Search
CPC ............ G06F 1/26; G06F 2203/04101; G06F 3/03545; G06F 3/044
See application file for complete search history.

(56) References Cited

U.S. PATENT DOCUMENTS

| | | | |
|---|---|---|---|
| 4,686,332 A | 8/1987 | Greanias et al. | |
| 7,663,607 B2 | 2/2010 | Hotelling et al. | |
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |
| 8,179,381 B2 | 5/2012 | Frey et al. | |

(Continued)

FOREIGN PATENT DOCUMENTS

WO 2012/129247 A2 9/2012

OTHER PUBLICATIONS

Myers, S.A., et al., "Electronic Devices With Concave Displays," U.S. Appl. No. 61/454,936, filed Mar. 21, 2011, 23 pages.

(Continued)

*Primary Examiner* — Chun-Nan Lin
(74) *Attorney, Agent, or Firm* — Seed IP Law Group LLP

(57) ABSTRACT

In one embodiment, a method includes receiving at a device first data transmitted from a stylus by near-field communication. The device determines a hover distance of the stylus in reference to the device based at least in part on the first data. The device is operated based at least in part on the hover distance of the stylus.

20 Claims, 6 Drawing Sheets

(56) References Cited

U.S. PATENT DOCUMENTS

| | | | | |
|---|---|---|---|---|
| 8,454,257 B2* | 6/2013 | Lin | B43K 29/00 | 401/195 |
| 8,493,359 B2* | 7/2013 | Wright | G06F 3/038 | 345/174 |
| 8,638,320 B2* | 1/2014 | Harley | G06F 3/0441 | 345/179 |
| 8,816,993 B2* | 8/2014 | Yuan | G06F 3/042 | 345/179 |
| 8,878,823 B1* | 11/2014 | Kremin | G06F 3/03545 | 345/179 |
| 8,928,635 B2* | 1/2015 | Harley | G06F 3/044 | 345/179 |
| 9,342,170 B2* | 5/2016 | Alexandersson | G06F 1/1694 | |
| 2004/0160429 A1* | 8/2004 | Blake | G06F 3/043 | 345/179 |
| 2008/0128180 A1* | 6/2008 | Perski | G06F 3/046 | 178/18.03 |
| 2008/0129709 A1* | 6/2008 | Lin | G06F 3/03545 | 345/179 |
| 2009/0315854 A1 | 12/2009 | Matsuo | | |
| 2010/0021022 A1* | 1/2010 | Pittel | G06F 3/03545 | 382/123 |
| 2010/0079414 A1* | 4/2010 | Ferlitsch | G06F 3/0421 | 345/179 |
| 2010/0170726 A1* | 7/2010 | Yeh | G06F 3/0446 | 178/19.03 |
| 2010/0283766 A1* | 11/2010 | Shieh | G06K 9/00154 | 345/179 |
| 2011/0155479 A1* | 6/2011 | Oda | G06F 3/046 | 178/18.06 |
| 2011/0169775 A1* | 7/2011 | Liaw | G06F 3/041 | 345/175 |
| 2011/0304557 A1* | 12/2011 | Wilburn | G06F 3/0488 | 345/173 |
| 2012/0043142 A1* | 2/2012 | Grivna | G06F 3/03545 | 178/19.03 |
| 2012/0050207 A1* | 3/2012 | Westhues | G06F 3/0416 | 345/174 |
| 2012/0068964 A1* | 3/2012 | Wright | G06F 3/03545 | 345/174 |
| 2012/0105362 A1* | 5/2012 | Kremin | G06F 3/03545 | 345/174 |
| 2012/0139879 A1* | 6/2012 | Kim | G06F 3/03545 | 345/179 |
| 2012/0154340 A1* | 6/2012 | Vuppu | G06F 3/0442 | 345/179 |
| 2012/0206330 A1* | 8/2012 | Cao | G06F 3/0383 | 345/156 |
| 2012/0206349 A1* | 8/2012 | Nowatzyk | G06F 3/03545 | 345/158 |
| 2012/0242588 A1 | 9/2012 | Myers et al. | | |
| 2012/0242592 A1 | 9/2012 | Rothkopf et al. | | |
| 2012/0243151 A1 | 9/2012 | Lynch | | |
| 2012/0243719 A1 | 9/2012 | Franklin et al. | | |
| 2012/0262407 A1* | 10/2012 | Hinckley | G06F 3/038 | 345/173 |
| 2012/0293451 A1* | 11/2012 | Van Schyndel | G06F 3/0416 | 345/174 |
| 2012/0327041 A1* | 12/2012 | Harley | G06F 3/0442 | 345/179 |
| 2012/0327042 A1* | 12/2012 | Harley | G06F 3/03545 | 345/179 |
| 2012/0331546 A1 | 12/2012 | Falkenburg et al. | | |
| 2013/0005249 A1* | 1/2013 | Nahidipour | H04B 5/0037 | 455/41.1 |
| 2013/0009907 A1* | 1/2013 | Rosenberg | G06F 3/046 | 345/174 |
| 2013/0021263 A1* | 1/2013 | Tong | G06F 3/04883 | 345/173 |
| 2013/0106777 A1* | 5/2013 | Yilmaz | G06F 21/32 | 345/174 |
| 2013/0113762 A1* | 5/2013 | Geaghan | G09G 5/003 | 345/179 |
| 2013/0203346 A1* | 8/2013 | Han | H04M 1/7253 | 455/41.1 |
| 2013/0234986 A1* | 9/2013 | Elias | G06F 3/03545 | 345/174 |
| 2013/0238744 A1* | 9/2013 | Paschke | G06F 9/543 | 709/216 |
| 2013/0257777 A1* | 10/2013 | Benko | G06F 3/0346 | 345/173 |
| 2013/0260689 A1* | 10/2013 | Haverinen | H02J 50/20 | 455/41.2 |
| 2013/0321283 A1* | 12/2013 | Mak | G06F 3/0488 | 345/173 |
| 2014/0092069 A1* | 4/2014 | Bentov | G06F 1/26 | 345/179 |
| 2014/0191988 A1* | 7/2014 | Corrion | G06F 3/046 | 345/173 |
| 2014/0218343 A1* | 8/2014 | Hicks | G06F 3/03545 | 345/179 |
| 2014/0253465 A1* | 9/2014 | Hicks | G06F 3/0416 | 345/173 |
| 2015/0138083 A1* | 5/2015 | Takano | G06F 3/0418 | 345/157 |
| 2016/0034140 A1* | 2/2016 | Navsariwala | G06F 3/0488 | 715/788 |
| 2016/0266663 A1* | 9/2016 | Holsen | G06F 3/04166 | |

OTHER PUBLICATIONS

Lynch, S.B., "Electronic Devices With Convex Displays," U.S. Appl. No. 61/454,950, filed Mar. 21, 2011, 28 pages.

Rothkopf, F.R.. et al., "Electronic Devices With Flexible Displays," U.S. Appl. No. 61/454,894, filed Mar. 21, 2011, 41 pages.

Bentov, I., Non-Final Rejection, U.S. Appl. No. 13/630,990, dated Mar. 11, 2015, 19 pages.

Bentov, I., Response to Non-Final Office Action, U.S. Appl. No. 13/630,990, dated Jun. 11, 2015, 12 pages.

Bentov, I., Final Rejection, U.S. Appl. No. 13/630,990, dated Sep. 25, 2015, 20 pages.

Bentov, I., RCE and Amendment, U.S. Appl. No. 13/630,990, dated Mar. 24, 2016, 15 pages.

Bentov, I., Non-Final Rejection, U.S. Appl. No. 13/630,990, dated May 25, 2016, 17 pages.

Bentov, I., Response to Non-Final Office Action, Ussn 13/630,990, dated Aug. 25, 2016, 17 pages.

Bentov, I., Final Rejection, U.S. Appl. No. 13/630,990, dated Nov. 14, 2016, 19 pages.

Bentov, I., Amendment to Final Office Action, U.S. Appl. No. 13/630,990, dated Jan. 17, 2017, 18 pages.

Bentov, I., Non-Final Rejection, U.S. Appl. No. 13/630,990, dated Feb. 10, 2017, 39 pages.

Bentov, I., Response to Non-Final Office Action, U.S. Appl. No. 13/630,990, dated Aug. 10, 2017, 35 pages.

Bentov, I., Notice of Allowance, U.S. Appl. No. 13/630,990, dated Nov. 8, 2017, 8 pages.

* cited by examiner

STYLUS COMMUNICATION WITH NEAR-FIELD COUPLING

TECHNICAL FIELD

This disclosure generally relates to active styluses.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
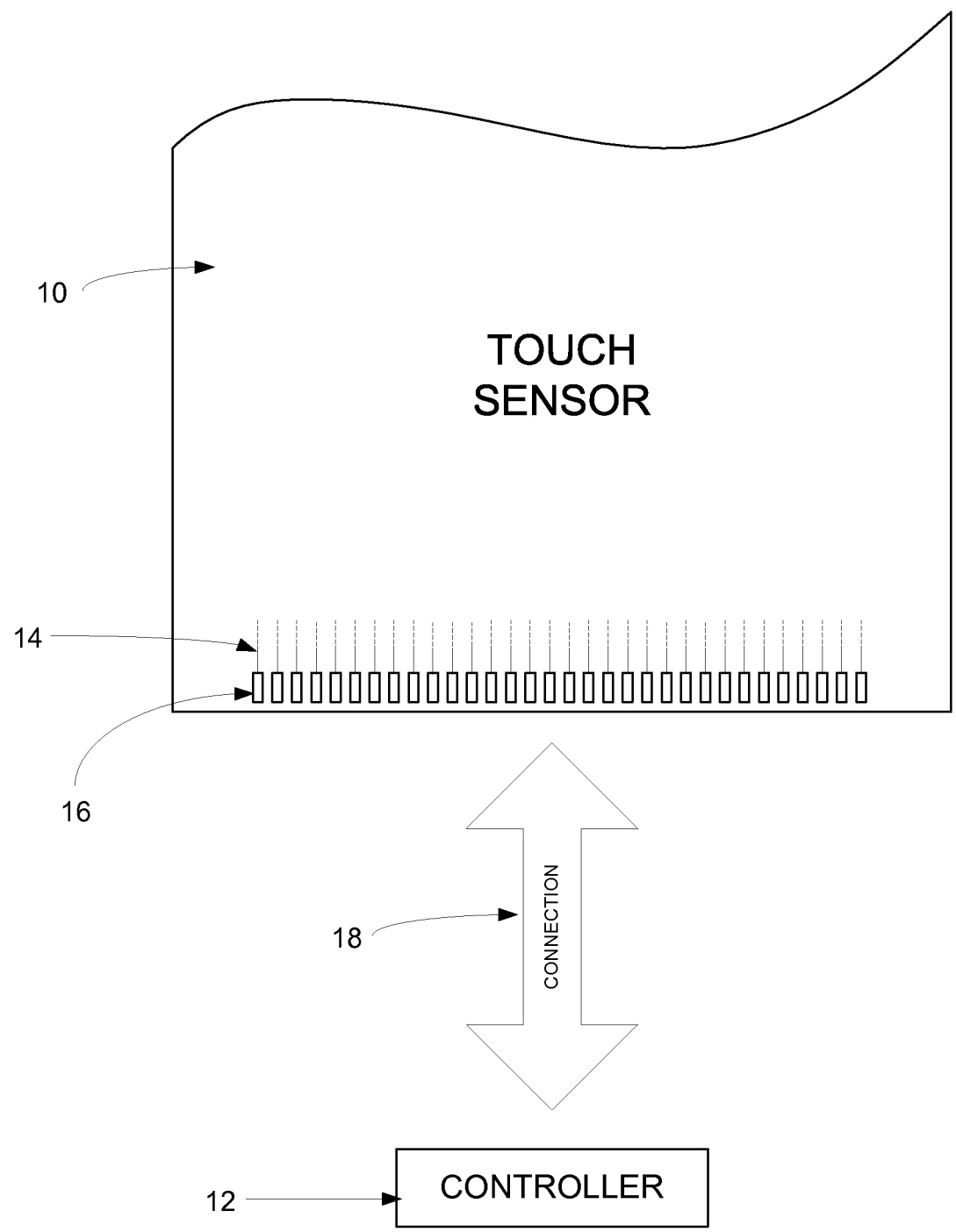
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of polyethylene terephthalate (PET) or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

One or more drive electrodes may together form a drive line running horizontally or vertically or in any suitable orientation, in particular embodiments. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), fuse-programmable arrays (FPGAs), or application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply and timing of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
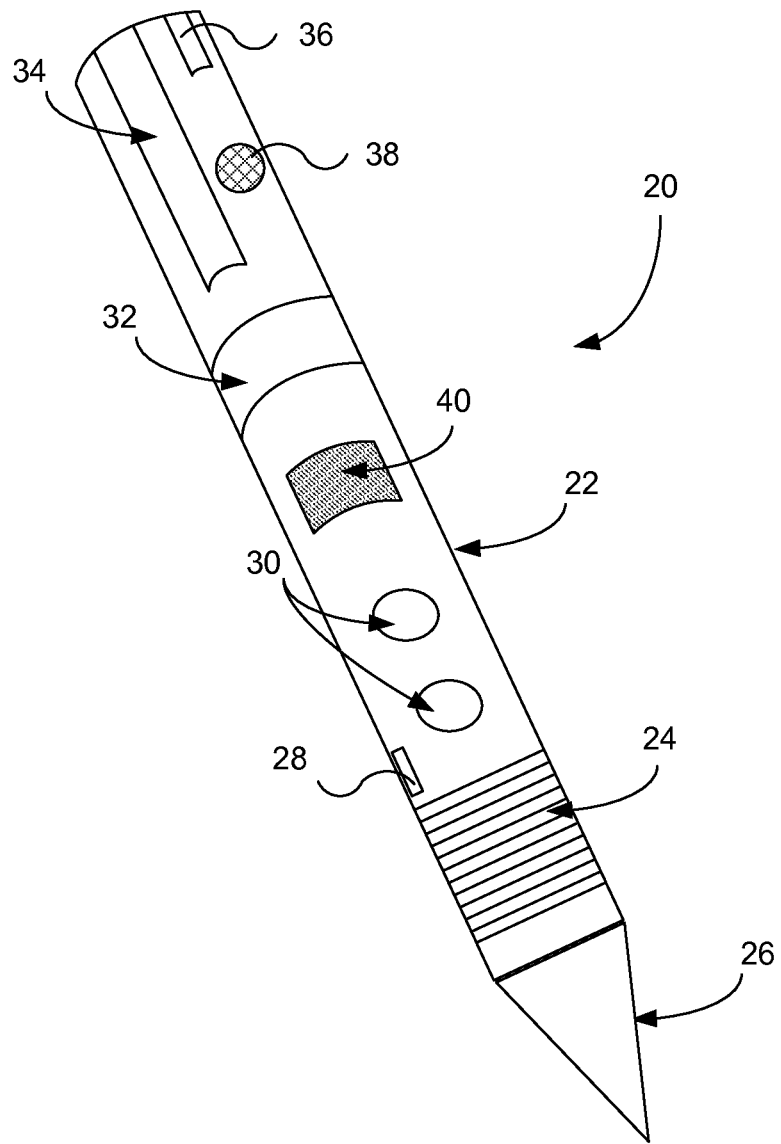
FIG. 2 illustrates an example active stylus exterior.

FIG. 2 illustrates an example exterior of an example active stylus 20, which may be used in conjunction with touch sensor 10 of FIG. 1. Active stylus 20 may include one or more components, such as buttons 30 or sliders 32 and 34 integrated with an outer body 22. These external components may provide for interaction between active stylus 20 and a user or between a device, such as touch screen 10, and a user. As an example and not by way of limitation, interactions may include communication between active stylus 20 and a device, enabling or altering functionality of active stylus 20 or a device, or providing feedback to or accepting input from one or more users. In one implementation, the device is touch screen 10; however, the device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 and one or more sliders 32 and 34. As an example and not by way of limitation, buttons 30 and sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accept feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Port 28 may transmit or receive signals wirelessly, for example using BlueTooth or wireless fidelity (WiFi) technologies. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
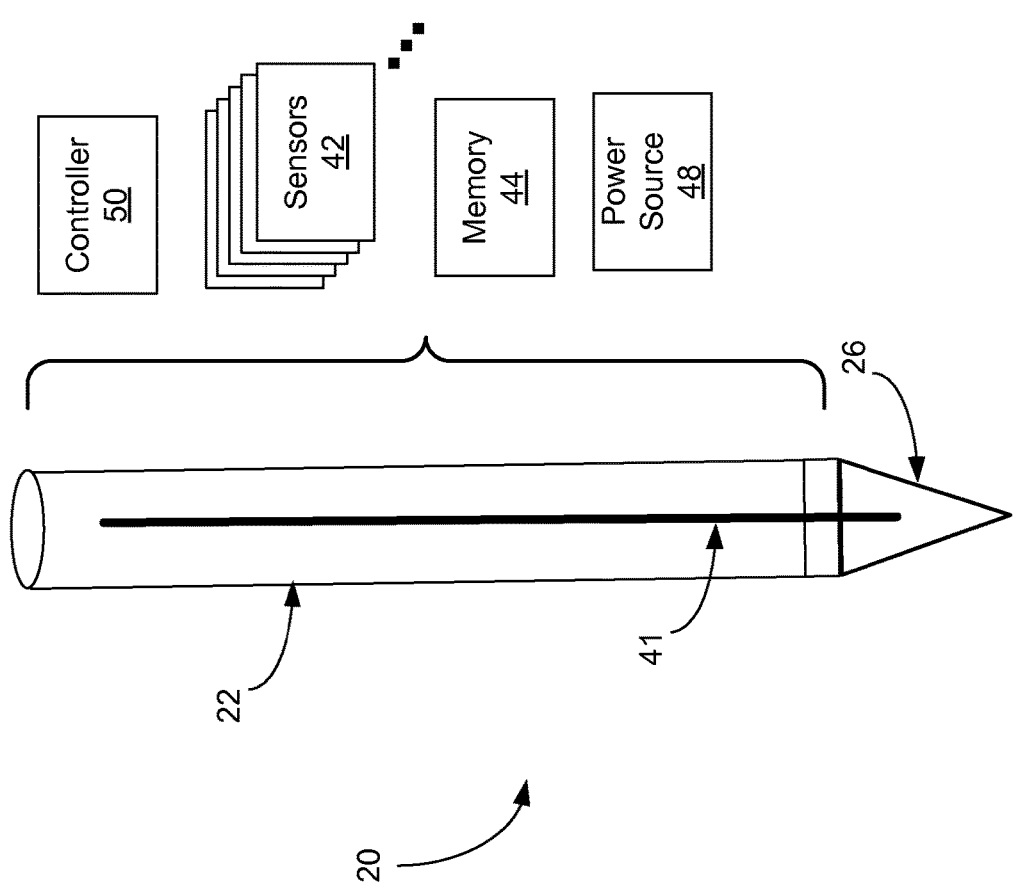
FIG. 3 illustrates an example active stylus interior.

FIG. 3 illustrates example internal components of active stylus 20. Active stylus 20 may include one or more internal components, such as a controller 50, sensors 42, memory 44, or a power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply and timing of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

Active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
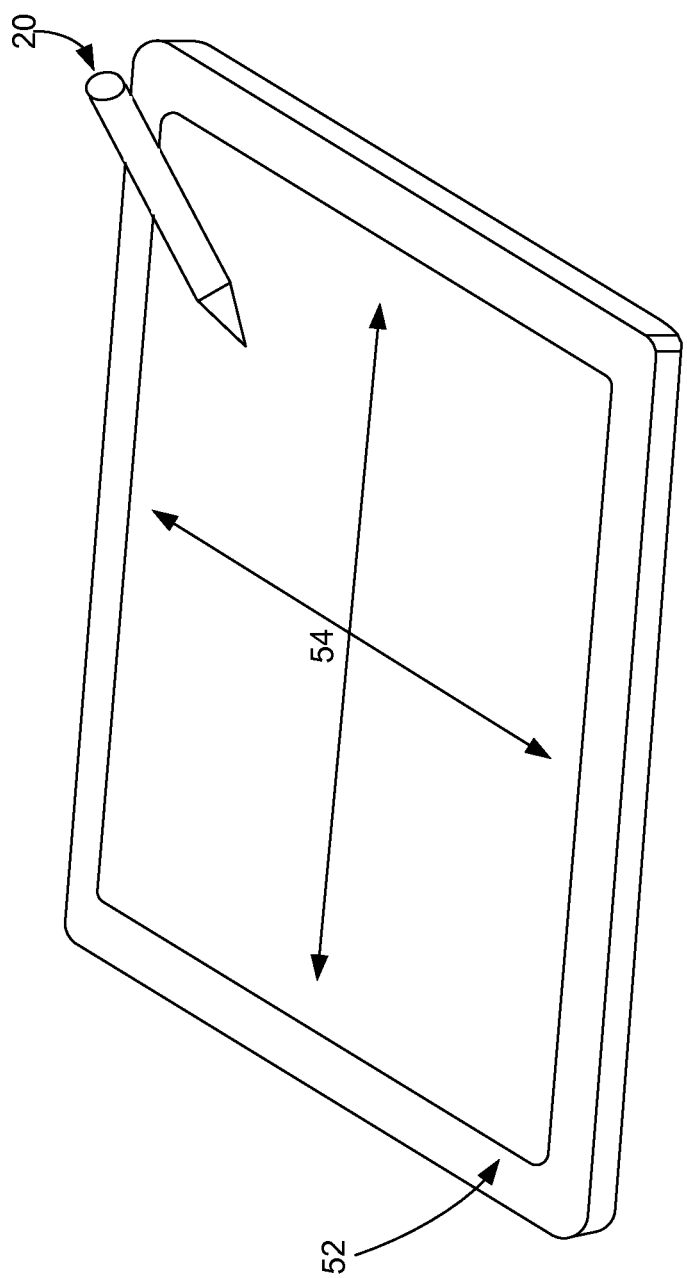
FIG. 4 illustrates an example active stylus, such as that illustrated in FIGS. 2 and 3, with a touch sensor, such as that illustrated in FIG. 1.

FIG. 4 illustrates an example active stylus 20 with an example device 52. One example of device 52 is touch screen 10 of FIG. 1. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

Active stylus 20 and device 52 may be synchronized prior to communication of data between active stylus 20 and device 52, in particular embodiments. As an example and not by way of limitation, active stylus 20 may be synchronized to device 52 through a pre-determined bit sequence transmitted by the touch sensor of device 52. As another example, active stylus 20 may be synchronized to device 52 by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

Measurement signal from the sensors of active stylus 20 may initiate, provide for, or terminate interactions between active stylus 20 and one or more devices 52 or one or more users, in particular embodiments as described above. Interaction between active stylus 20 and device 52 may occur when active stylus 20 is contacting or in proximity to device 52. As an example, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may, in particular embodiments, be used in a hover configuration or mode. In hover mode, active stylus 20 is in proximity to but is not touching device 52 (e.g. touch sensor 10 of device 52). One potential benefit of using a stylus in a hover mode is that a physical imprint (e.g., a fingerprint, grease print, or vibration from touch) is not left on device 52; this may allow for increased security in the use of device 52. As an example, a gesture used while hovering may be used to unlock device 52 without leaving any physical imprint (e.g., a pattern of fingerprints on device 52) that may be detected. The distance that active stylus 20 hovers above or in proximity to device 52 may be determined either by active stylus 20 or by device 52, including, for example, by controller 12 or controller 50. This is described in detail further below.

The determination of hover distance (e.g., the location of active stylus 20 in the z-direction with respect to device 52) may be used to determine how device 52 or stylus 20 operates. By way of example, the determination of hover distance may be used to determine whether a user is making a gesture (and if so, which gesture) or whether there has been a change in orientation in active stylus 20 with respect to device 52 (e.g., allowing active stylus 20 to be used as a joystick). The determination of the hover distance of active stylus 20 may be used to decide whether to employ high voltage signals for signal transmission (on either device 52 or active stylus 20) to provide for better signal-to-noise ratios. As another example, the hover distance may be used in conjunction with algorithms for dynamic configuration of electrodes in active stylus tip 26 so that when it is determined that active stylus 20 is hovering beyond a particular distance from device 52, electrodes in active stylus tip 26 are reconfigured in a particular manner. Similarly, the hover distance may be used to dynamically adjust signal thresholds used by active stylus 20 or device 52 to reduce the effects of noise.

The distance that active stylus 20 hovers in proximity to device 52 may be measured by laser infrarometers, ultrasound, or sensors, any of which may be on active stylus 20, on device 52, or on both active stylus 20 and device 52. The hover distance may also be determined using touch sensor 10 in particular embodiments, without the need for additional sensors on device 52. As discussed above, touch sensor 10 may include an array of drive and sense electrodes forming an array of capacitive nodes. As an example, the change in mutual capacitance of each capacitive node in the array on touch sensor 10 may be measured to determine stylus location, as the mutual capacitance measured at each capacitive node will vary with stylus position in the x-, y-, and z-(hover) directions with respect to device 52. In particular, the measured change in mutual capacitance experienced by each capacitive node in the array on touch sensor 10 will be larger the closer that active stylus 20 is to the capacitive node in any (x-,y-, or z-) direction. By examining the pattern of changes in measured mutual capacitance values for the capacitive nodes in the array on touch sensor 10 (either for the array as a whole or, in certain embodiments, within subgroups of capacitive nodes in the array), the hover distance of active stylus 20 may be determined. As an example, by analyzing the pattern of capacitive nodes that experienced a measured change in mutual capacitance (and those capacitive nodes that did not, or that experienced a measured change to a lesser extent), the location of active stylus 20 (e.g., the location of the active stylus tip 26) may be determined in the x-y plane with respect to device 52. As another example, by analyzing the amount of the measured change in mutual capacitance for the array of capacitive nodes on touch sensor 10, the location of active stylus 20 may be determined in the z-direction with respect to device 52. In particular embodiments, by analyzing the number of capacitive nodes in the array on touch sensor 10 that experienced a measured change in mutual capacitance, as well as the degree of change of mutual capacitance, it may be possible to determine if a stylus (whether active or passive) is in proximity to device 52, and if so, whether it is hovering or touching device 52.

The proximity of active stylus 20 to device 52 (e.g. hover distance of active stylus 20 with respect to device 52) may also be determined by signals transmitted via near-field communication. Near-field communication (NFC) is a set of technologies that may use magnetic coupling for short-range wireless signal transmission. The signal transmission may occur between two transceivers (e.g. antennas sized for magnetic H-field transmission and/or reception, along with NFC controllers) without any touching or physical connection between the transceivers. As an example, an antenna may be placed in the tip 26 of active stylus 20. As another example, an antenna may be placed on the back of touch sensor 10 or, as yet another example, may be integrated into touch sensor 10 (e.g. if using FLM). NFC may operate in a frequency range centered around 13.56 MHz, with data rates ranging from 106 Kbit/s to 424 Kbit/s and operational distances between approximately 4 cm and 20 cm. An NFC initiator (e.g. an NFC antenna and controller of device 52) generates a magnetic field that may power or communicate with an NFC target (e.g. an NFC antenna and controller of active stylus 20). Either active stylus 20 or device 52 may act as an NFC initiator or an NFC target, and in particular embodiments, both active stylus 20 and device 52 are equipped to act as both an NFC initiator and an NFC target. An NFC target may contain data. The NFC target may be a passive target (e.g. a tag, chip, or controller) that may be powered by an NFC initiator (e.g. an NFC antenna and controller). In one example, an NFC passive target such as an NFC controller of active stylus 20 would not require a battery to operate (e.g. to receive or transmit signals), as energy may be harvested from the carrier field generated by the NFC initiator (e.g. device 52) and stored in active stylus 20, for example in a capacitor, for later retrieval and use. In another example, an NFC passive target such as an NFC controller of active stylus 20 may charge its battery from energy harvested from the carrier field generated by the NFC initiator (e.g. device 52). An NFC target may also be an active target, e.g., a target capable of acting as an initiator, as well. If both device 52 and active stylus 20 are able to act as NFC targets and NFC initiators (e.g. both have a power supply), then peer-to-peer communication may be possible between device 52 and active stylus 20. In such an example, active stylus 20 and device 52 may alternately generate their own fields, and each may deactivate its field while waiting for data (in order to act as a target). In yet other examples, NFC devices may be able to transmit and receive data at the same time. An active stylus equipped with NFC capabilities may function well when it hovers in proximity to device 52, for example in distances ranging between approximately 0 and 20 cm. The distance between active stylus 20 and device 52 may be calculated between a particular location on the body of active stylus 20 (e.g., the point of active stylus tip 26) and a particular location on device 52 (e.g., a particular point on touch sensor 10) in particular embodiments.

NFC may include modulation of the transmitted signals, in particular embodiments. As an example, amplitude shift-keying may be used in the transmission of NFC signals between active stylus 20 and device 52. As another example, Miller coding or Manchester coding may be used to transfer data. Signals transmitted (e.g. in either direction between active stylus 20 and device 52) by NFC may contain any type of information including, for example, the location of active stylus 20 (e.g. based on the presence or strength of the magnetic field of device 52 measured by active stylus 20). The location information may include whether the stylus is in proximity to device 52 or not, and if so, whether the stylus is hovering above device 52 (and the hover distance of stylus 20 with reference to device 52). The determination that active stylus 20 is in a hover mode above device 52 may cause device 52 or active stylus 20 to operate in a certain manner, as described above. By measuring hover distance, a user may hover (with active stylus 20) and use device 52 without contacting device 52. As an example, a user can use device 52 (e.g. touch sensor 10) as a piano. As another example, a user may use active stylus 20 to make a gesture (e.g., a signature) while hovering that may be used to unlock or authenticate active stylus 20. By unlocking or authenticating device 52 using a three-dimensional gesture as opposed to a two-dimensional gesture (done by contacting device 52, perhaps leaving an imprint), more security can be provided to the user of device 52 and active stylus 20. That is, a three-dimensional gesture (using the x-, y-, and z-directions with respect to device 52) may be harder to copy than a two-dimensional gesture (using only the x- and y-directions), and, additionally, a gesture completed while hovering will not leave an imprint on device 52 that may be intercepted. As another example, the user may use active stylus 20 while hovering for gaming purposes.

In addition to stylus location information, the signals communicated via NFC may also include, for example, a status of the active stylus. As an example, a battery level or power status of active stylus 20 may be communicated via NFC. The status of active stylus 20 may also indicate whether a user of active stylus 20 has input a command to the stylus. For example, a user may press a button on the stylus (e.g. a physical button or a soft button). The pressing of the button may indicate, for example, that the user wishes a line she is drawing on touch display 54 to be bolder. The pressing of the button on active stylus 20 may indicate a status of active stylus 20 that may be communicated to device 52 via NFC. As discussed above, any suitable type of information may be communicated between active stylus 20 and device 52 via NFC, allowing for a logical connection between the stylus and the device even if there is not a physical (e.g. touch-based) connection between them.

Figure 5:
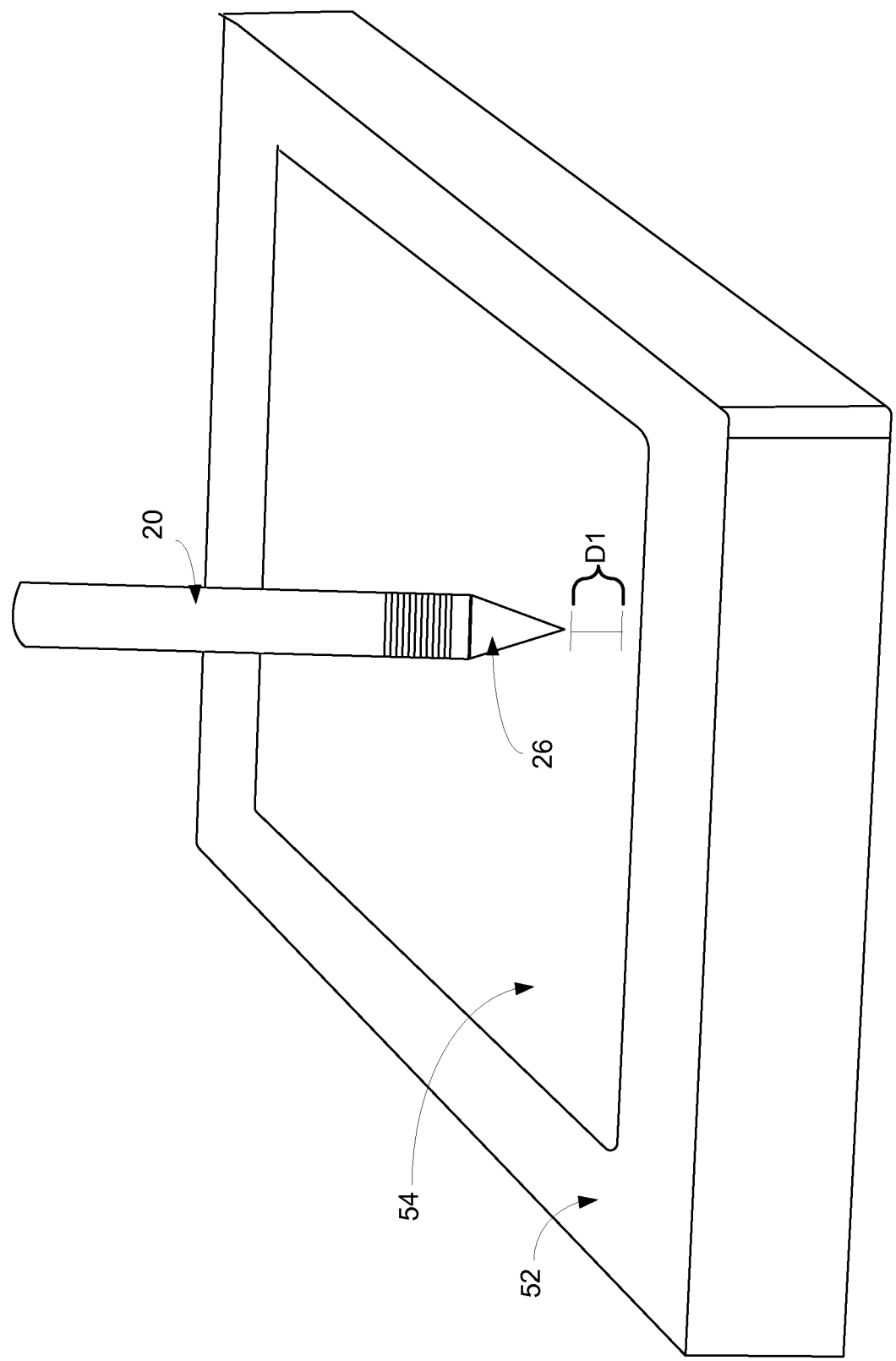
FIG. 5 illustrates an example active stylus in proximity to a device.

In FIG. 5, active stylus 20 is near touch-sensitive display 54 of touch-sensitive device 52. Tip 26 of active stylus 20 is hovering a distance D1 away from touch-sensitive display 54. One or more NFC antennas in tip 26 may, in particular embodiments, receive NFC signals from and transmit NFC signals to one or more NFC antennas in device 52. The distance D1 may be communicated via NFC between stylus 20 and device 52.

Figure 6:
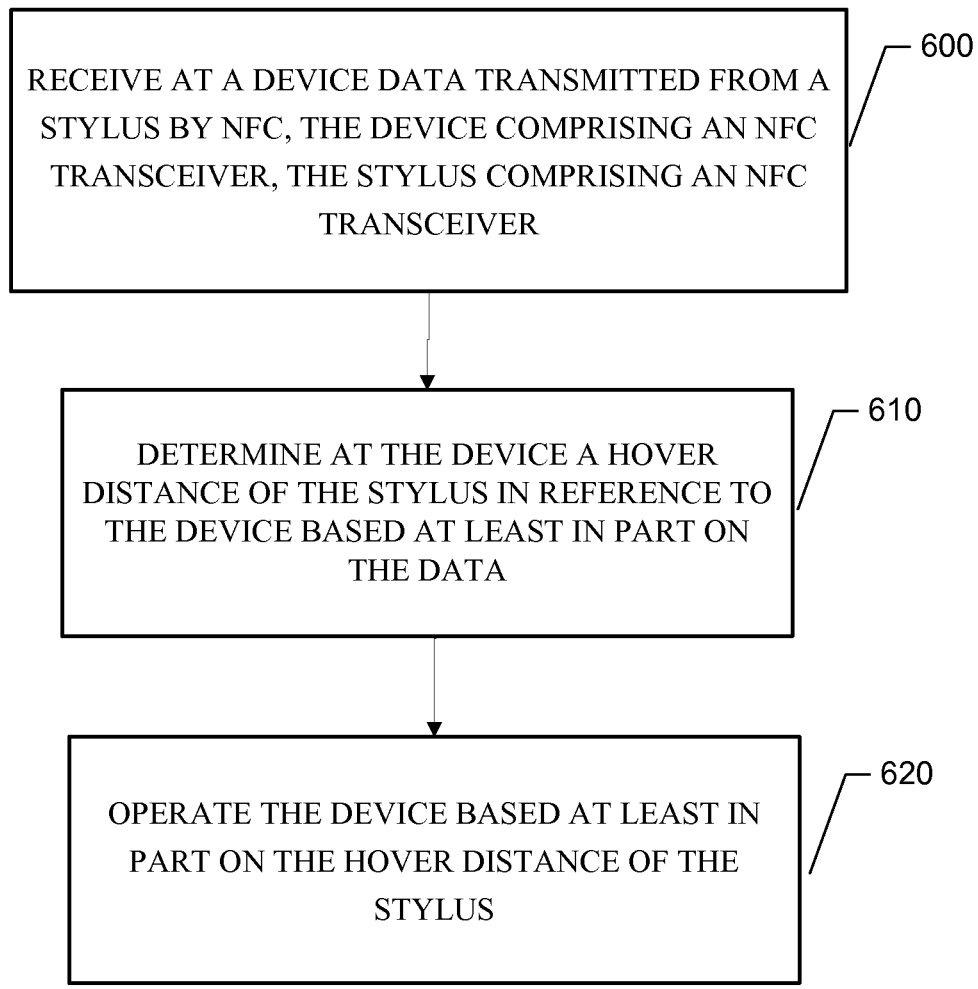
FIG. 6 illustrates an example method for near-field communication between an active stylus and a device.

FIG. 6 illustrates an example method for near-field communication between active stylus 20 and device 52. The method begins at step 600, where a device (e.g. device 52) receives data transmitted from a stylus (e.g. active stylus 20) via NFC. The device includes an NFC transceiver (e.g. antenna and controller), and the stylus also includes an NFC transceiver. At step 610, the device determines a hover distance of the stylus in reference to the device, based at least in part on the data transmitted from the stylus. The hover distance of stylus may, for example, be determined based on data related to the strength of the magnetic field of the device 52 as measured by active stylus 20. At step 620, the device is operated based at least in part on the location of the stylus. For example, if the stylus is hovering above the device at a particular distance, the stylus may be determined to be in a hover mode, and the device may be operated such that signal thresholds in the device are adjusted to reduce the effects of noise. In particular embodiments, the device may also receive second data from the stylus (relating, e.g., to a power status of the stylus) or third data from the stylus (relating, e.g., to a user input received at the stylus), and may operate accordingly. The device may also communicate data to the stylus. In particular embodiments, the steps illustrated in FIG. 6 may be repeated any number of times. Although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Herein, reference to a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks, floppy disk drives (FDDs), magnetic tapes, holographic storage media, solid-state drives (SSDs), RAM-drives, SECURE DIGITAL cards, SECURE DIGITAL drives, any another suitable computer-readable non-transitory storage media, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
   measuring, by an input device, a strength of a magnetic field of a near-field communication;
   transmitting a first data indicating the strength of the magnetic field, which is measured by the input device, to a device;
   determining, at the device, a hover distance of the input device in reference to the device based at least in part on the first data; and
   operating the device based at least in part on the hover distance of the input device.

2. The method of claim 1, wherein the transmitting is performed via the near-field communication.

3. The method of claim 1, wherein the first data further comprises at least one of the following:
   a location of the input device; and
   the hover distance of the input device in reference to the device.

4. The method of claim 1, wherein:
   the device comprises a near-field communication transceiver; and
   the input device comprises a near-field communication transceiver.

5. The method of claim 1, wherein the device and the input device are each configured to act as a near-field communication initiator and a near-field communication target.

6. The method of claim 1, further comprising:
   receiving, at the device, second data transmitted from the input device by near-field communication, the second data comprising a power status of the input device; and
   operating the device based at least in part on the power status of the input device.

7. The method of claim 1, wherein operating the device based at least in part on the hover distance of the input device comprises adjusting a signal threshold in the device.

8. The method of claim 1, further comprising:
   receiving, at the device, second data transmitted from the input device by near-field communication, the second data comprising a user input to the input device; and
   operating the device based at least in part on the user input to the input device.

9. The method of claim 1, further comprising:
   determining, at the device, a hover gesture of the input device; and
   authenticating the device based at least in part on the hover gesture.

10. One or more computer-readable non-transitory storage media embodying logic that is operable when executed to:

receive, at a device, first data transmitted from an input device, the first data indicating a strength of a magnetic field of a near-field communication which is measured by the input device;

determine, at the device, a hover distance of the input device in reference to the device based at least in part on the first data; and operate the device based at least in part on the hover distance of the input device.

11. The one or more computer-readable non-transitory storage media of claim 10, wherein the first data further comprises at least one of the following:

a location of the input device; and the hover distance of the input device in reference to the device.

12. The one or more computer-readable non-transitory storage media of claim 10, wherein:

the device comprises a near-field communication transceiver; and the input device comprises a near-field communication transceiver.

13. The one or more computer-readable non-transitory storage media of claim 10, wherein the device and the input device are each configured to act as a near-field communication initiator and a near-field communication target.

14. The one or more computer-readable non-transitory storage media of claim 10, wherein the logic is further operable when executed to:

receive, at the device, second data transmitted from the input device by near-field communication, operate the device based at least in part on the power status of the input device.

15. The one or more computer-readable non-transitory storage media of claim 10, wherein operating the device based at least in part on the hover distance of the input device comprises adjusting a signal threshold in the device.

16. The one or more computer-readable non-transitory storage media of claim 10, wherein the logic is further operable when executed to:

determine, at the device, a hover gesture of the input device; and authenticate the device based at least in part on the hover gesture.

17. An input device comprising:

one or more electrodes configured to wirelessly transmit signals to and receive signals from a device; and one or more processors configured to:

measure a strength of a magnetic field of a near-field communication;

transmit first data, via the one or more electrodes, to the device, the first data indicating the strength of the magnetic field, wherein the device is operable to determine a hover distance of the input device in reference to the device based at least in part on the first data; and control operation of the input device based at least in part on the hover distance of the input device.

18. The input device of claim 17, wherein the first data further comprises at least one of the following:

a location of the input device; and the hover distance of the input device in reference to the device.

19. The input device of claim 17, comprising a near-field communication transceiver.

20. The input device of claim 17, configured to act as a near-field communication initiator or a near-field communication target.

* * * * *